United States Patent [19]

Matsuyama et al.

[11] Patent Number: 4,722,031
[45] Date of Patent: Jan. 26, 1988

[54] HEADLIGHT DEVICE FOR A VEHICLE

[75] Inventors: Yoji Matsuyama, Tokyo; Azusa Noda; Kozo Yamada, both of Saitama, all of Japan

[73] Assignee: Honda Giken Kogyo Kabushiki Kaisha, Tokyo, Japan

[21] Appl. No.: 931,925

[22] Filed: Nov. 17, 1986

Related U.S. Application Data

[63] Continuation-in-part of Ser. No. 728,010, Apr. 29, 1985, abandoned.

[30] Foreign Application Priority Data

Apr. 27, 1984 [JP] Japan .................................. 59-85569

[51] Int. Cl.⁴ .......................................... F21V 33/00
[52] U.S. Cl. ...................................... 362/72; 362/258; 362/387; 362/390
[58] Field of Search ................... 362/72, 80, 61, 396, 362/258, 306, 369, 387, 390; 180/210; 315/82; 310/67 A; 280/289 R

[56] References Cited

U.S. PATENT DOCUMENTS

| | | | |
|---|---|---|---|
| 1,222,458 | 4/1917 | Peterson | 362/72 |
| 1,309,714 | 8/1922 | Anderson | 362/387 |
| 1,319,473 | 10/1919 | Grigsby | 362/258 |
| 1,386,803 | 8/1921 | Ryder | 362/258 |
| 1,959,979 | 5/1934 | Gunderson | 362/258 |
| 2,009,682 | 7/1935 | Stofer | 362/258 |
| 2,655,592 | 10/1953 | Michel et al. | 362/387 |
| 2,721,929 | 10/1955 | Schwatz et al. | 362/258 |
| 4,325,108 | 4/1982 | Spingler | 362/258 |
| 4,625,264 | 11/1986 | Nagashima | 362/72 |

Primary Examiner—William A. Cuchlinski, Jr.
Assistant Examiner—D. M. Cox
Attorney, Agent, or Firm—Lyon & Lyon

[57] ABSTRACT

A headlight assembly mounting a headlight to a vehicle by means of resilient blocks such that the headlight and associated headlight frame may be detached. An electrical cord is associated with the headlight such that the headlight may be moved some distance from the vehicle. The cord has a preset coil and extends to a container which easily receives the cord with the light in position on the vehicle. An electrical case provides for electrical connection of the hedlight cord and other associated electrical components. The container may be fixed adjacent to the electrical case with both being fixed to the vehicle.

7 Claims, 9 Drawing Figures

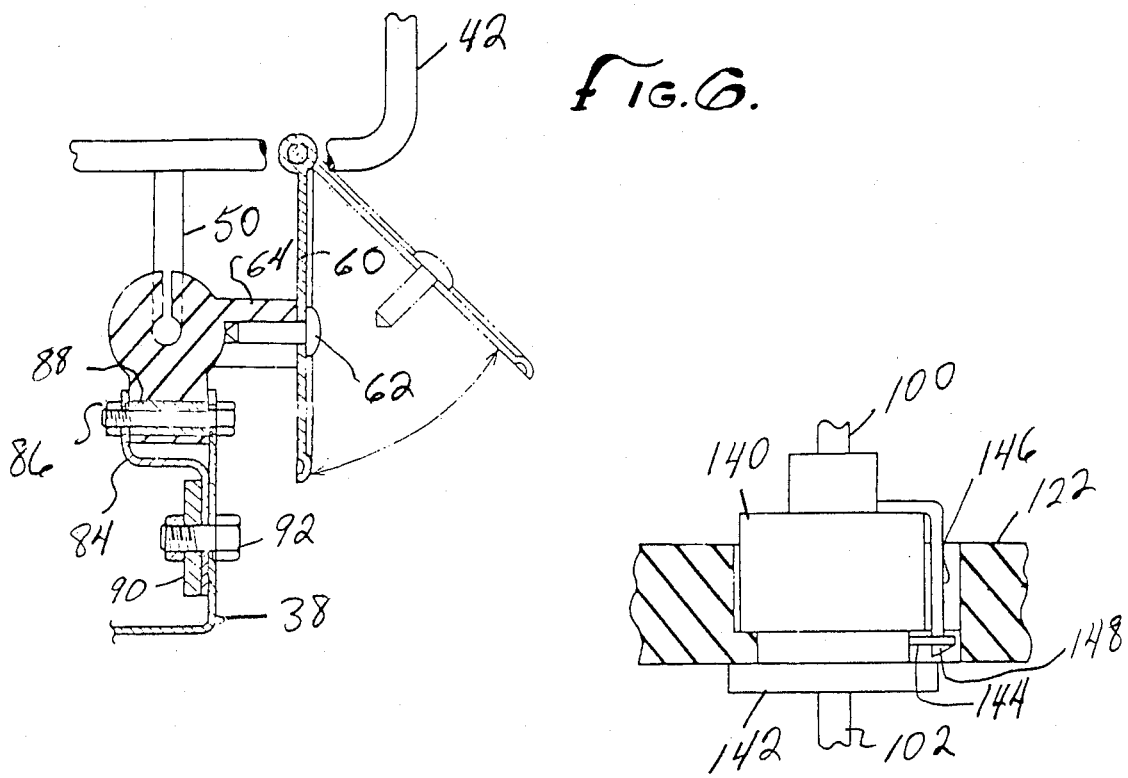
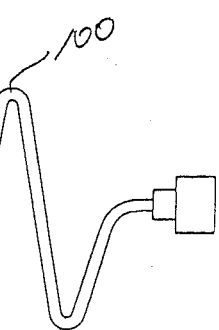

HEADLIGHT DEVICE FOR A VEHICLE

This application is a continuation, of application Ser. No. 728,010, filed 4-29-85, now abandoned.

BACKGROUND OF THE INVENTION

The field of the present invention is mounting devices for headlights on vehicles.

Headlights typically are secured to a vehicle by rigid attachment means such as bolts or the like. With smaller vehicles such as motorcycles and all-terrain vehicles, the headlights are rigidly attached to the handle or upper part of the front fork or top bridge bracket of such vehicles. Tools are required for removal of headlights mounted by such means and little or no shock absorbing is available.

It has been found that balloon tired off-road vehicles may be employed for utility purposes where, at night, it is advantageous to use the headlight on the vehicle for illuminating objects. Naturally, it is not always practical to have the vehicle oriented such that the light will shine on the area to be illuminated. Because of the difficulty in removing conventional headlights and the need for tools to do so, other lighting means are often required where the vehicle cannot be easily oriented to illuminate the required subject.

SUMMARY OF THE INVENTION

The present invention is directed to a headlight mechanism for mounting of headlights on a handlebar-type vehicle and more specifically for arranging such a mechanism to insure greatest convenience and protection for the electrical system. A resilient mounting assembly associated with the vehicle is employed to advantageously reduce shock to the headlight and to enable the headlight to be removed easily and without tools. On off-road vehicles, shock absorbing characteristics are of advantage to the longevity of the lighting mechanism. The ability to remove the headlight easily enables a desired subject to be illuminated without requiring the orientation of the vehicle such that a mounted headlight might be advantageously directed.

To provide further utility, a container may be provided to accommodate the electrical cord associated with the headlight. To insure that the headlight may be useful over and above its utility at a fixed location at the front of the vehicle, an extra-length cord may be used. A container may be provided to receive the cord when the headlight is attached to the vehicle. Thus, an extra-length cord may be stored out of the way and without exposure to the elements. To further accommodate such a system, an adjacent electrical case may be associated with the container so as to provide a convenient and structural support for the end of the cord at the vehicle. The cord may be given a permanent set to provide a convenient coil for easy stowage in the container.

Accordingly, it is an object of the present invention to provide an improved headlight attachment mechanism for vehicles. Other objects and advantages will appear hereinafter.

BRIEF DESCRIPTION OF THE DRAWINGS.

FIG. 6 is a cross-sectional view of a mounting structure associated with the present invention.

FIG. 7 is a side view of a headlight mechanism and an electrical cord of the present invention.

FIG. 9 is a cross-sectional view of an electrical coupling associated with the present invention.

DETAILED DESCRIPTION OF THE PREFERRED EMBODIMENT

Figure 2:
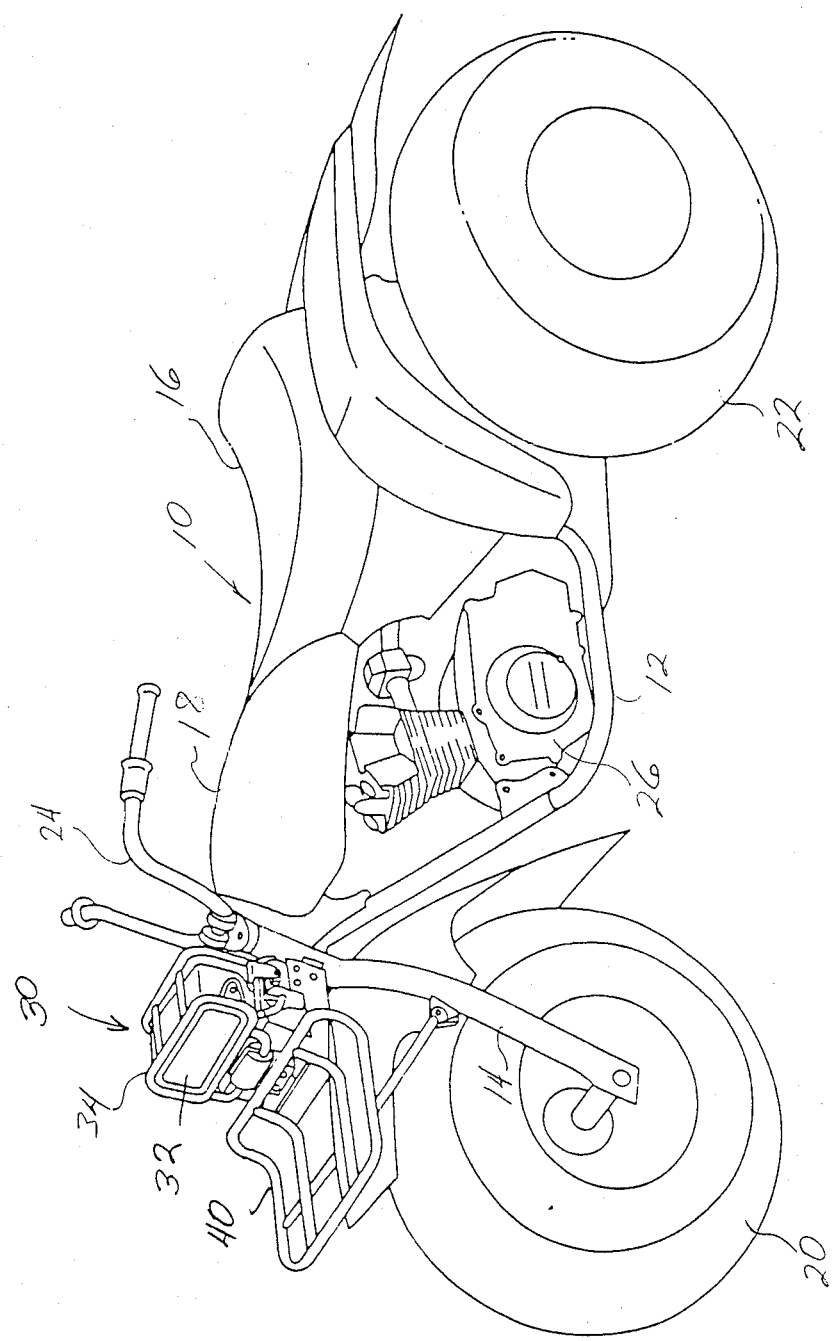
FIG. 2 is a perspective view of a vehicle employing the headlight mechanism of the present invention.
Figure 3:
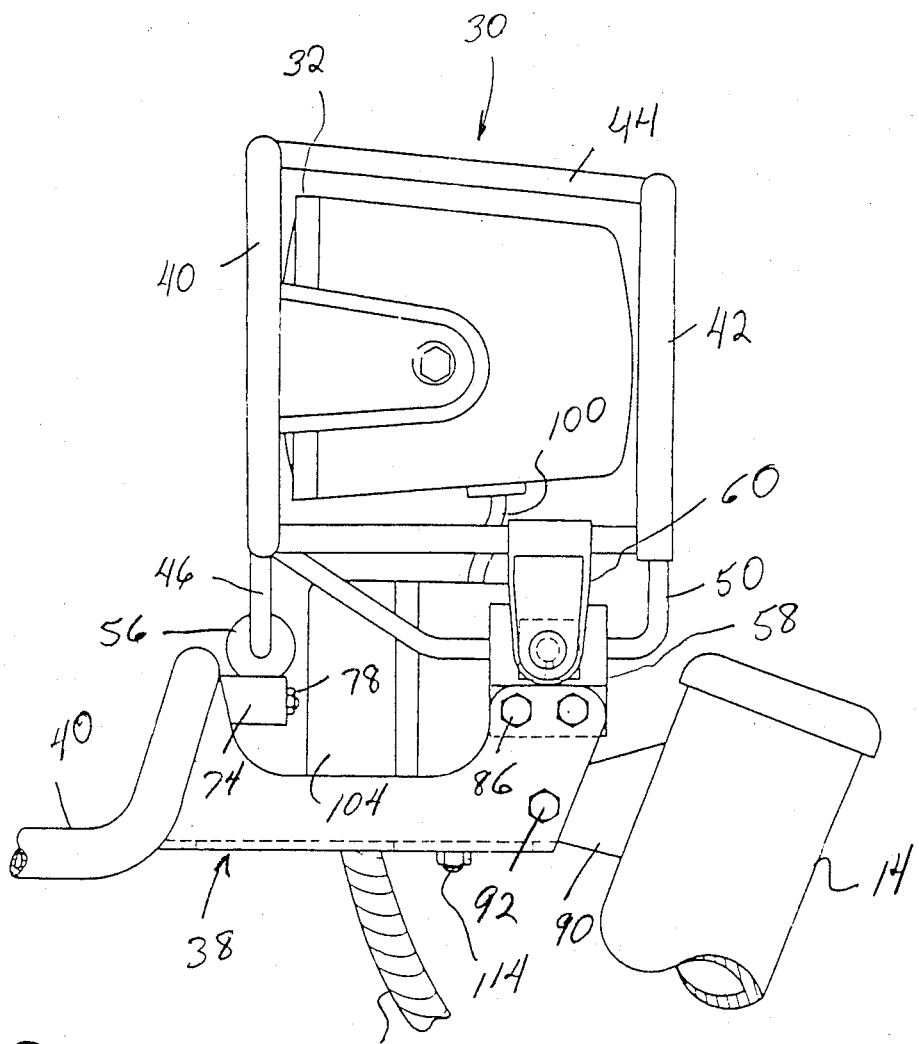
FIG. 3 is a side view of the mounting mechanism for a headlight as may be associated with the present invention.

Turning in detail to the drawings, an off-road three-wheel handlebar-type vehicle is illustrated as including a body 10 as best seen in FIG. 2, including a frame 12, a front fork assembly 14, a seat 16, and a fuel tank 18. A front wheel 20 is mounted to the front fork assembly 14 while left and right rear wheels 22 are mounted to the rear of the vehicle. The front fork includes handlebars 24 for steering. An engine 26 is mounted to the frame 12 centrally on the vehicle.

Mounted to the front fork assembly to face generally forwardly of the vehicle is a headlight assembly, generally designated 30. The headlight assembly 30, illustrated on the front fork assembly 14, may be fixed to the vehicle at other locations as desired. The assembly 30 includes a headlight 32 and a headlight attachment mechanism 34. The headlight attachment mechanism 34 in turn includes a frame structure 36 and a carrier stay assembly 38. The carrier stay assembly 38 provides a mounting support for the headlight as well as for a carrier 40, both thus mounted to the vehicle. The attachment mechanism 34 provides for association between the frame 36 and the carrier stay assembly 38 by a resilient and releasable mounting mechanism. The releasable nature of the attachment mechanism 34 enables removal of the headlight 32 from its fixed position on the vehicle without the need for tools or complicated assembly or disassembly procedures.

The headlight frame 36 is generally a pipe or rod frame having front and back frame structures 41 and 42, respectively, with frame elements 44 extending between the frame structures 40 and 42. A front foot 46 and two side feet 48 and 50 are rigidly associated with the frame and include horizontally disposed sections for association with the carrier stay assembly 38.

Figure 1:
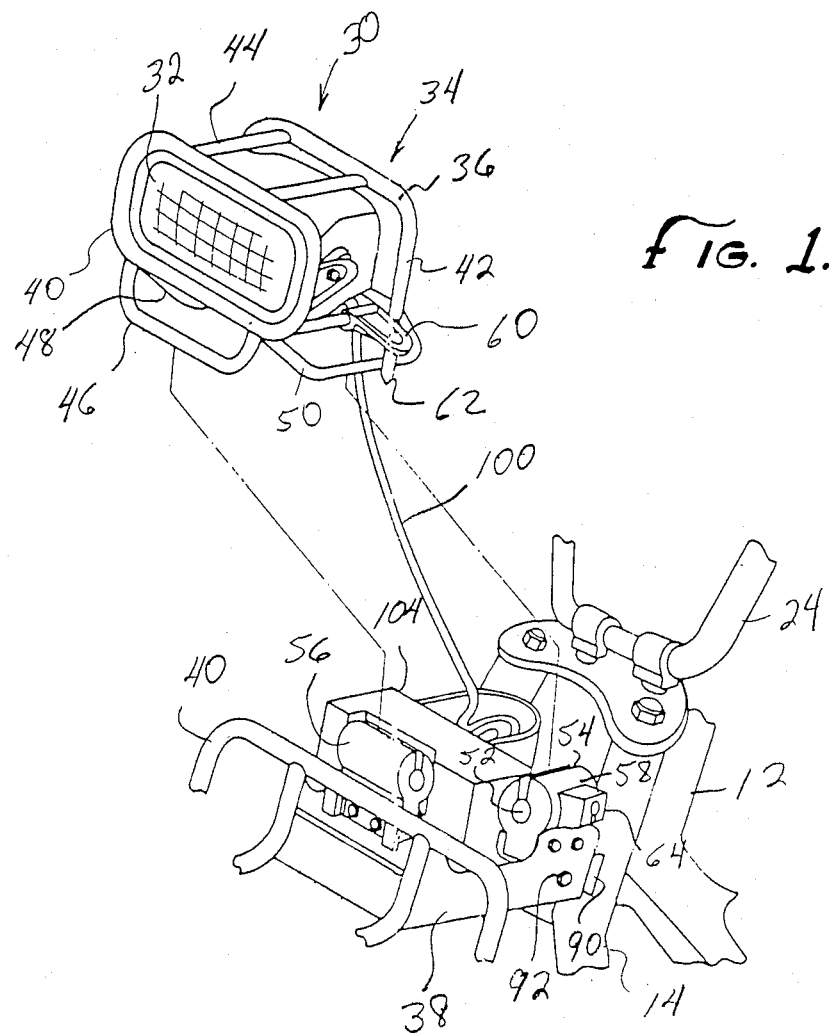
FIG. 1 is a perspective view of a headlight attachment mechanism of the present invention with a headlight detached therefrom.
Figure 4:
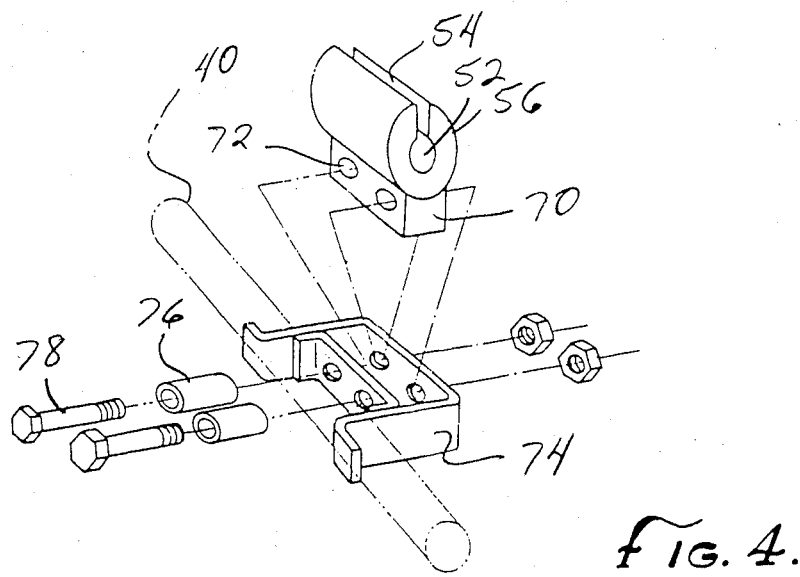
FIG. 4 is a detailed perspective of a resilient mounting bracket shown in exploded view which may be associated with the present invention.
Figure 5:
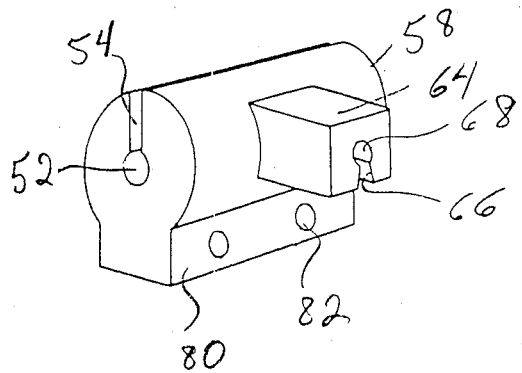
FIG. 5 is a perspective view of a mounting bracket associated with the present invention.

The carrier stay assembly 38 includes a plurality of resilient blocks into which the feet 46, 48 and 50 of the frame 36 may be positioned. Each resilient block includes a hole 52 extending therethrough with a slit 54 extending from the periphery of each block to the hole 52. There is a front block 56 so constructed and two side blocks 58. The feet 46, 48 and 50 may thus be forced through the slits 54 in each of the blocks 56 and 58, respectively, for location in the holes 52. To lock the frame 36 to the carrier stay assembly 38, certain of the frame elements 44 include swingable arms 60 having pins 62 thereon. The pins are associated with locking bosses 64 located on the side blocks 58. A slit 66 and hole 68 are once again positioned for lateral introduction of the pin 62 into the boss. The construction and association of the mounting blocks 56 and 58 are seen in FIG. 4, FIG. 5 and FIG. 6. In FIG. 4, the mounting block 56 is best illustrated as including a mounting base 70 having two mounting holes 72 therethrough. The base 70 fits within a mounting bracket 74 to receive grommets 76 and fasteners 78. The mounting bracket 74 is permanently affixed to a cross-member of the carrier 40. A similar mounting arrangement for the side blocks 58 is also employed. A mounting base 80 having holes 82 therethrough is associated with the carrier 38 and a bracket 84 by means of fasteners 86 with intermediate grommets 88. Brackets 90 retain by means of fasteners 92 the carrier stay 38 on the front front assembly 13.

For the mounting and dismounting of the headlight 32 and associated frame 36, the feet 46, 48 and 50 are either forced into or out of the slits 54 in the blocks 56 and 58. The arms 60 and pins 62 to either side of the frame 36 are either engaged or disengaged from the blocks 58 to lock or unlock the frame 36 from the carrier stay 38 and in turn the frame.

As part of the headlight assembly 30, an electrical cord 100 supplies power to the headlight 32 from the vehicle. A wiring harness 102 leads from the headlight assembly to the vehicle for further electrical connection. An electrical case 104 provides for a coupling between cords 100 and 102. A best view of the electrical case 104 and associated components is provided in FIG. 8. The electrical case 104 includes a cover 106 and a base structure 108. Fasteners 110 associate the cover 106 and the base 108 by conventional means. Associated with the base 108 is a container 112. The base 108 and container 112 are fixed to the vehicle by means of conventional fasteners 114. Actual attachment is conveniently provided by means of the carrier stay 38. The container 112 receives one end of the electrical cord 100 while the other end is received by the headlight 32. A grommet 116 provides access between the container 112 and the electrical case 104 for the electrical cord 100. FIG. 7 illustrates a permanent set to the electrical cord 100 to form a resilient coil for convenient packing. The permanent set may be introduced to the cord 100 by conventional heat forming. The set to the cord and the size and length of the cord determine the size of the container 112 such that the container 112 will retain the cord 100 in a protected and stowed condition when the light 32 is fixed to the vehicle.

Figure 8:
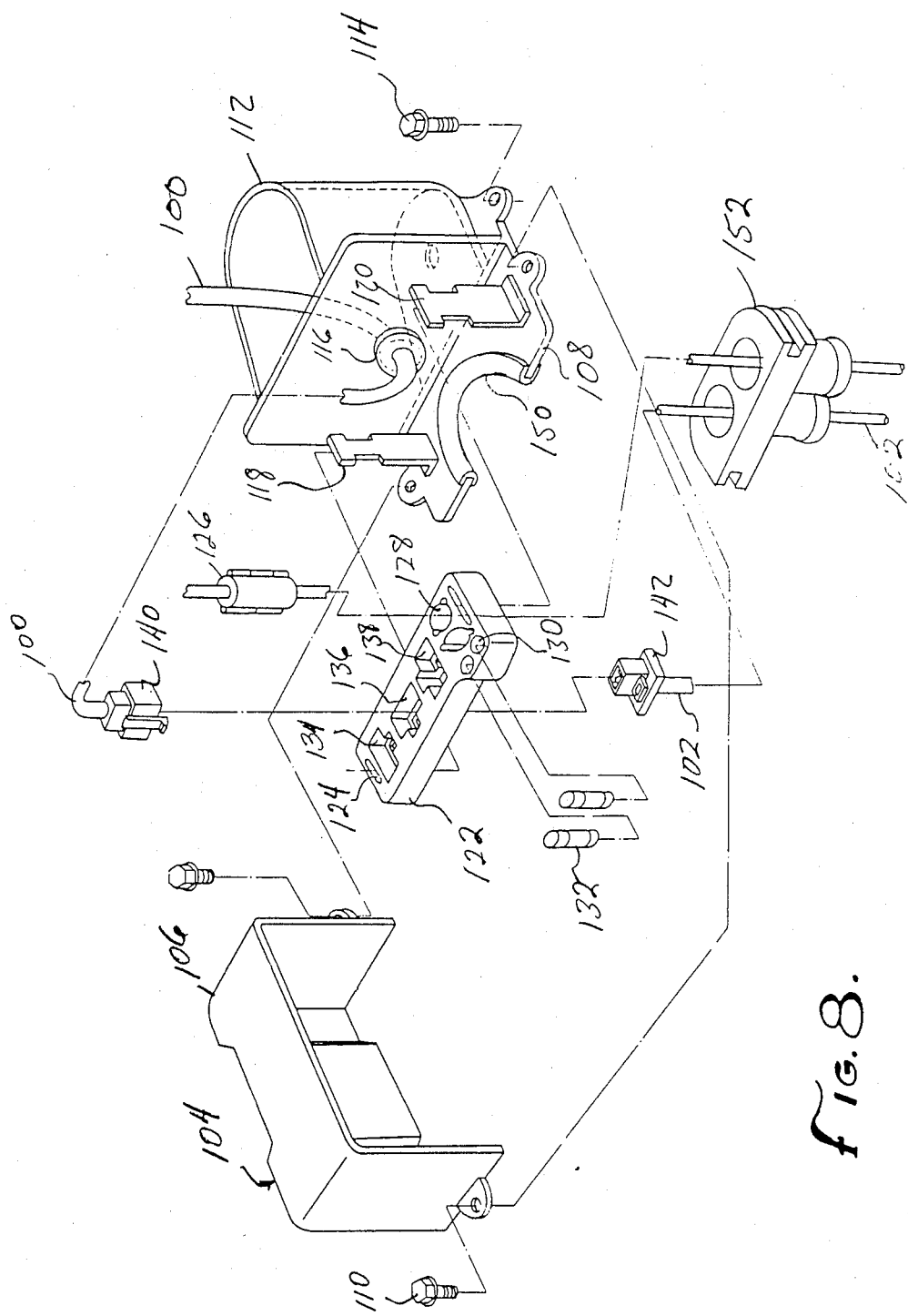
FIG. 8 is a perspective exploded view of a container and electrical case of the present invention.

Within the electrical case 104, mounting posts 118 and 120 are fixed relative to the base 108. These mounting posts 118 and 120 receive a rubber stand 122 at slits 124. The stand 122 includes cavities and passageways to receive a variety of electrical components. A fuse 126 is illustrated as being positioned within a cavity 128. Spare fuse holders 130 receive spare fuses 132 for convenient storage. Coupler cavities 134, 136 and 138 are provided for receipt of a plurality of electrical components. As illustrated in FIG. 8, a coupler head 140 associated with the cord 100 is intended to be positioned within the cavity 136. The cord 102 terminates at a coupler 142 also to be associated with the cavity 136. This relationship is better illustrated in FIG. 9.

Accommodated within the cavity 136 is a locking mechanism associated with the couplers 140 and 142. This mechanism includes an eye 144 to receive a lock 146 including a claw 148 for engaging the eye 144. Flanges on the several components 122, 140 and 142 act to locate the connection in a fixed condition relative to the stand 122. To help seal the compartment within which the stand 122 is positioned, a rubber seal 150 is positioned about an axis port with a grommet 152 cooperating therewith for introduction of the various electrical conductors.

Thus, an improved headlight assembly is disclosed which accommodates easy removal of the headlight for use as a tool apart from the vehicle upon which it is normally mounted. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A headlight assembly for a handlebar-type vehicle, comprising:
   a headlight mount secured to said vehicle;
   shock absorbing resilient means for releasably attaching said headlight to said headlight mount;
   an electrical case housing a coupling stand attached to said headlight mount subjacent said headlight;
   a container fixedly positioned adjacent said electrical case; and
   means for supplying electric power between said vehicle and said headlight including a wire harness extending between said vehicle and said case and having one end connected to said coupling stand and an electric cord of extended length adapted for coiled disposition in said container, said electrical cord having one end connected to said coupling stand in electrical contact with said wire harness and its other end connected to said headlight.

2. The headlight assembly according to claim 1 in which said coupling stand is formed of shock absorbing resilient material and said wire harness and said electric cord are detachably connected by coupler plugs mounted in said coupling stand.

3. The headlight assembly according to claim 2 in which said coupling plugs include means for releasably locking the connection therebetween.

4. The headlight assembly according to claim 1 in which said electrical cord is permanently set to form a resilient coil sized for reception in said container.

5. The headlight assembly according to claim 1 including a frame structure having rod-like frame elements surrounding said headlight, said headlight mount having secured thereto a plurality of bodies of resilient material formed to releasably grippingly engage said frame elements.

6. The headlight assembly according to claim 5 in which said frame structure includes frame elements organized to define generally rectangularly arranged front and oppositely spaced parallel side feet depending from said headlight for mounted disposition in said resilient bodies.

7. The headlight assembly according to claim 6 including a locking arm pivotally mounted on at least one of said side feet, said locking arm containing a lock pin releasably engaging an associated resilient body for securing said headlight to said headlight mount.

* * * * *